United States Patent [19]

Lemmon

[11] 4,043,003

[45] Aug. 23, 1977

[54] BONE SECTIONING TOOL FOR VERTEBRATE FISH

[76] Inventor: George H. Lemmon, Hagerman, Idaho 83332

[21] Appl. No.: 711,510

[22] Filed: Aug. 4, 1976

[51] Int. Cl.$^2$ .......................................... A22C 25/16
[52] U.S. Cl. ........................................ 17/67; 17/57; 17/61
[58] Field of Search ............ 17/56, 57, 61, 64, 66–69, 17/18, 19, 29, 46

[56] References Cited

U.S. PATENT DOCUMENTS

| 356,725 | 1/1887 | Moses | 17/61 |
| 1,901,625 | 3/1933 | Birdseye | 17/55 X |
| 1,928,718 | 10/1933 | Covey | 17/29 X |
| 2,154,187 | 4/1939 | Scoville | 17/67 |
| 2,275,884 | 3/1942 | Barker | 17/29 |
| 2,471,062 | 5/1949 | Davis | 17/55 |
| 2,552,985 | 5/1951 | Leuschner | 17/57 |

FOREIGN PATENT DOCUMENTS 188,624  3/1956  Austria ...................................... 17/67

*Primary Examiner*—David H. Brown
*Attorney, Agent, or Firm*—Wells, St. John & Roberts

[57] ABSTRACT

A tool is described that enables the sectioning of the rib bones of vertebrate fish into shortened ingestible sections. The tool includes a plurality of spaced circular saw blades that are mounted to an elongated arbor. The arbor is rotatably carried on a handle supported frame and is powered to rotate by an electric motor. Spacer discs are situated between the adjacent saw blades to determine the lateral distance between adjacent cuts. Elongated spring members are located between adjacent saw blades and are sprung away from the spaced discs. The spring members are utilized to prevent the flesh from binding between adjacent blades during operation of the tool. The spacer discs also function to control the depth of the cut for the multiple saw blades so that only a minimal portion of the flesh is cut along with the rib bones.

4 Claims, 4 Drawing Figures

BONE SECTIONING TOOL FOR VERTEBRATE FISH

BACKGROUND OF THE INVENTION

The present apparatus is related to the field of fish butchering apparatus and more particularly to such apparatus utilized to prepare an eviscerated vertebrate fish for human consumption.

Fish bones, particularly the elongated needle-like ribs of the large vertebrate fish present a substantial problem to both consumers and the fish preparing and marketing industry. The rib bones are not only difficult to remove from cooked or uncooked fish, but are potentially harmful when ingested. Therefore, it is very desirable to either totally remove the bones from a fish prior to cooking or to reduce the bones to an ingestible size. In addition, the tedious process of removing bones from vertebrate fish often results in a loss of up to fifteen percent of the edible adjacent flesh. The present invention is therefore concerned with an apparatus for cutting the rib bones of a fish into shortened lengths that are safe for ingestion. The composition of the bones presents no health hazard and can in fact add important nutrients.

It is an object of the present invention to provide a bone sectioning tool that will effectively reduce fish rib bones to lengths that are safely ingestible.

A further object is to provide such a tool that will enable sectioning of the fish rib bones without otherwise harming or wasting the adjacent flesh.

A still further object is to provide such a tool that may be adapted for use as a hand-held, manually operable tool or may be incorporated into a machine for automatic production-line functioning.

These and still further objects and advantages will become apparent from the following description which, taken with the accompanying drawings, describe a preferred form of the invention. It is to be noted however, that the drawings and following description are given only by way of example to set forth one form of the invention. They are not intended to place restrictions upon the scope of my invention, which is defined by the claims found at the end of the description.

BRIEF DESCRIPTION OF THE DRAWINGS

A preferred form of the present invention is illustrated in accompanying drawings in which.

DETAILED DESCRIPTION

Figure 4:
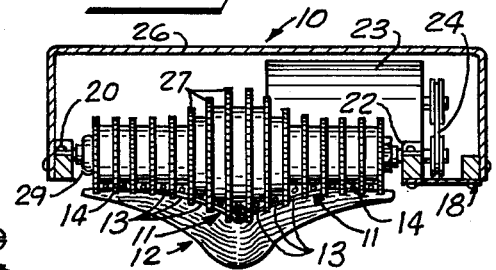
FIG. 4 is a reduced diagrammatic view illustrating the operation of the present invention on an eviscerated fish; said fish being shown in lateral cross section.

The present fish bone sectioning tool is illustrated in the accompanying drawings and generally designated therein by the reference character 10. FIG. 4 illustrates the basic purpose of the present invention to section the otherwise elongated needle-shaped rib bones 11 of a vertebrate fish 12 into shortened ingestible lengths 13. The rib bones are cut by the present tool 10 as the fish 12 is held with its back against a support surface and the sides splayed outwardly exposing the walls 14 of the abdomen. Cuts are made through the flesh adjacent the walls 14 to a depth slightly greater than that of the rib bones 11.

It should be noted that though the tool 10 as shown is embodied in a hand-held, manually operable device, it may be as easily adapted for use in large volume production wherein the cutting elements and drive mechanisms would be associated with a machine for either moving the tool or moving a fish carcass past the cutting elements.

The illustrated tool includes an elongated handle 17 that is adapted to enable the tool to be hand-held and moved manually longitudinally along the length of the fish to perform the rib-sectioning function. The handle 17 is affixed to an open frame 18. Frame 18 rotatably carries an elongated arbor shaft 19 that is substantially perpendicular to the handle 17.

Shaft 19 is freely rotatably carried by bushings 20 on the frame 18. A drive means 22 is provided to rotate the shaft about its center axis. Drive means 22 includes an electric motor 23 mounted to frame 18. Motor 23 is connected to shaft 19 through a pulley and belt assembly 24. It is well understood that commercially available, gear-drive mechanisms or other drive and transmission mechanisms may be easily adapted to the present drive assembly.

Figure 3:
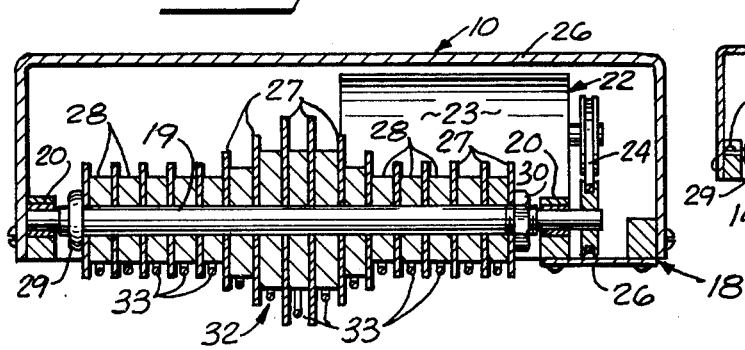
FIG. 3 is a section view taken along line 3—3 in FIG. 2.

Drive means 22 and adjacent area are enclosed by a housing 26 (FIG. 3). Housing 26 is removably connected to frame 18 to enclose the motor and pulley arrangement to protect the moving parts from moisture ordinarily encountered in operation.

A very important feature of the present invention is the particular arrangement of a plurality of circular saw blades 27 on arbor shaft 19. As may be noted, the saw blades 27 are circular and are spaced apart in substantially equal distances along the length of shaft 19. Spacer discs 28 are provided to separate the individual saw blades by distaces equal to the preferred length of rib bone sections 13. It is my experience that the spacing should be less than three eighths of one inch between adjacent blades. Fish rib bone sections under this length are safely ingestible.

The saw blades 27 may be of different diameter, increasing in diameter toward the longitudinal center of the arbor shaft 19 in order to conform to the cross-sectional configuration of the splayed fish sides (FIG. 4). This configuration enables the tool to be operated to prepare a fish in a single stroke or movement of the tool along the length of the fish body.

The spacing discs 28 are also of varying diameters in order to preset the depth of cut for the adjacent saw blades 27. Preferably the depth of cut is approximately one eighth of an inch for each blade. Deeper cuts are not necessary since the rib bones are ordinarily located close to the cavity walls 14. Further, the one-eighth inch cutting depth assures that the blades will not cut completely through the fish sides. The spacer discs 28 may be cylindrical as shown or may taper in a curvature complementary to the curvature of the splayed fish sides.

A space of approximately three eighths of an inch may be provided at the center of the number of blades in order that the blades may straddle the fish backbone. An alternative could be the provision of a heavier (thicker dimension along the shaft axis) blade (not shown) of a diameter sufficient to cut into the flesh and completely remove the backbone. However, this step is not entirely necessary and may be performed by a separate machine as a different function in the fish preparation procedure.

The arbor shaft 19 is provided with a mounting boss toward one end thereof. The blades 27 and discs 28 are removable to facilitate replacement. The blades and discs are forced against the mounting boss 29 by a nut 30 threadably engaged at the opposite end of the shaft 19. This feature not only facilitates replacement of the blades but adapts the tool for use on fish of different size and/or bone characteristics.

Figure 1:
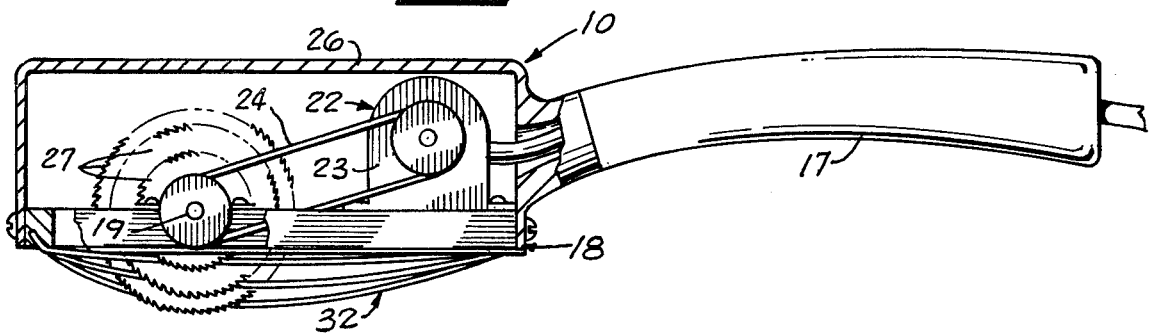
FIG. 1 is a side elevational view of the present invention embodied in a hand-held tool.
Figure 2:
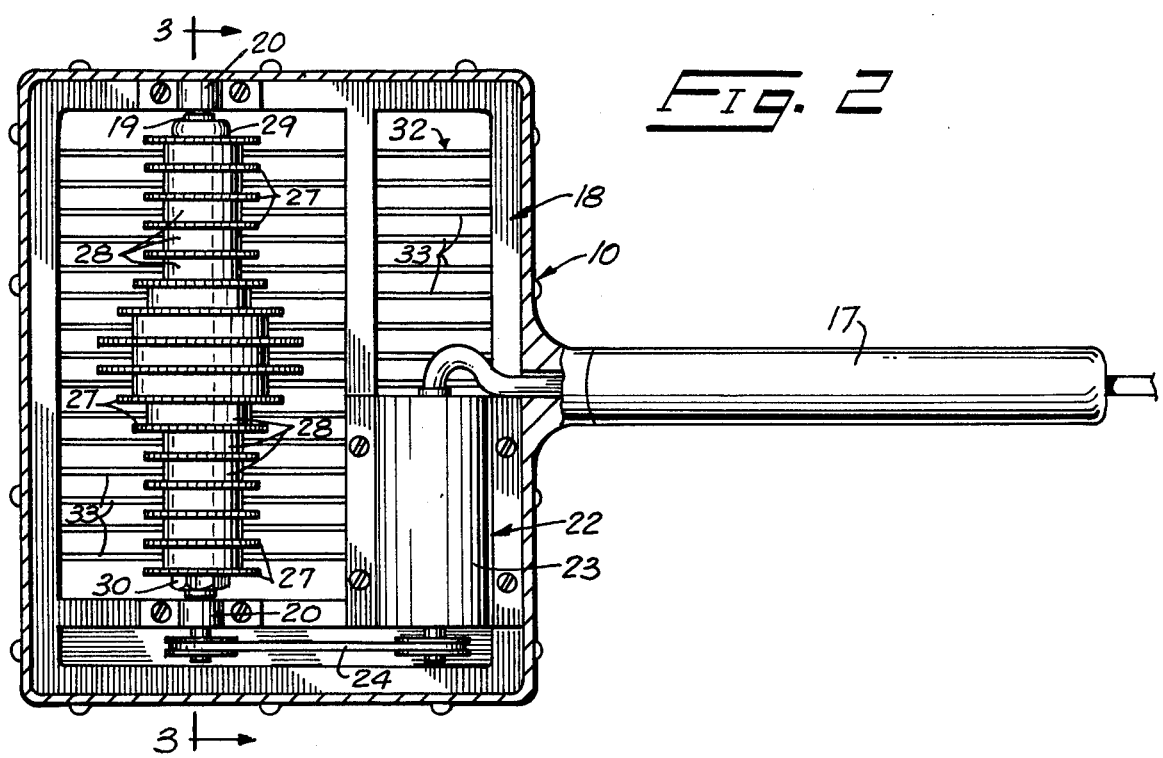
FIG. 2 is a fragmentary sectioned plan view.

In operation, there may be a tendency for the flesh or bones between adjacent blades to bind between those blades and as a result, clog the blades. Therefore, I provide a resilient flesh engaging means 32 to prevent such an occurrence. Means 32 is provided in the form of a number of spring members 33, each located between an adjacent pair of saw blades 27. The spring members 33 are elongated and arcuate. They are mounted at opposite ends of the frame 18 and extend substantially perpendicular to the rotational axis of shaft 19 between the blades 27. The arcuate members 33 normally are located outwardly adjacent to the periphery of discs 28 (FIG. 1) but slightly inward of the cutting teeth of saw blades 27. In operation, the spring members 33 are forced inwardly by the adjacent flesh against the surfaces of the discs 28. The spring force of the members 33, however, effectively prevent binding of the flesh or bones between adjacent blades and therefore successfully prevent waste of the edible flesh and prevent clogging between the blades.

In operation, the present tool is first connected to a power source such as ordinary household current. This actuates the motor 23 to rotate arbor shaft 19. It is preferred that the drive means 22 be designed so as to rotate the shaft at approximately 4500 RPM. Once activated, the tool is ready for use. A fish is laid back-down against a support surface. The walls of the abdomen are exposed by splaying the sides outwardly to the cross-sectional configuration shown in FIG. 4. The tool is then moved against the splayed sides longitudinally parallel to the backbone of the fish with the space between the center blades straddling the backbone. The tool is pressed against the fish sides so the saw blades become embedded to the depth set by the surfaces of spaced discs 28 and springs 33. As the tool is moved longitudinally along the length of the fish, the blades 27 cut through the rib bones and thereby section them into equal lengths equal to the spacing between adjacent blades. This distance as discussed above, is less than three eighths of an inch. The cutting depth of the blade is preferably in the vicinity of one-eighth of an inch to allow sectioning of the ribs without cutting through the fish sides. The result is a whole fish body that may be prepared by ordinary culinary practices.

It may have become evident from the above description and attached drawings that various changes and modifications may be made therein. It is therefore intended that only the following claims be taken as definitions of my invention.

What I claim is:

1. A bone sectioning tool for severing the rib bones of vertebrate fish without damaging the flesh, comprising:
   a frame;
   an elongated arbor shaft rotatably mounted to the frame;
   a plurality of circular saw blades mounted to the arbor shaft for coaxial rotation therewith;
   spacer discs on the shaft between adjacent saw blades for spacing the blades substantially equally apart, and wherein each disc has a diameter slightly less than the diameters of adjacent saw blades;
   wherein the saw blades and discs are of varying diameters and are arranged on the arbor shaft increasing in diameter toward the longitudinal center of the arbor shaft to complement the cross-sectional curvature of the splayed sides of an eviscerated vertebrate fish and to substantially limit the depth of cut of the blades;
   leaf spring members between adjacent blades and adjacent the blade periphery for preventing binding of rib bones between adjacent blades and for preventing the blades from substantially penetrating into the flesh while severing the bones; and
   drive means for rotating the shaft and blades to cut the rib bones into short ingestible sections of lengths equal to the spacing between the saw blades.

2. The bone sectioning tool as set out by claim 1 wherein the axial spacing between adjacent blades is less than three eighths of one inch.

3. The bone sectioning tool as set out by claim 1 wherein the saw blades and spacer discs are removable from the arbor shaft and wherein the arbor shaft includes a boss near one end for retaining the saw blades and spacer discs and a lug nut at an opposite end for pressing the blades and discs together against the boss.

4. The bone sectioning tool as defined by claim 1 wherein the tool is hand held with a handle extending outwardly from the frame.

* * * * *